United States Patent [19]

Hayes

[11] Patent Number: 5,425,879
[45] Date of Patent: * Jun. 20, 1995

[54] REMOVAL OF BASE RESIDUES FROM POLY(VINYL ALCOHOL) REACTION-SLURRIES

[75] Inventor: Richard A. Hayes, Houston, Tex.

[73] Assignee: E. I. du Pont de Nemours and Company, Wilmington, Del.

[ * ] Notice: The portion of the term of this patent subsequent to Jun. 7, 2011 has been disclaimed.

[21] Appl. No.: 143,762

[22] Filed: Nov. 1, 1993

[51] Int. Cl.$^6$ .............................................. B01J 39/04
[52] U.S. Cl. .................................... 210/681; 528/482
[58] Field of Search ................... 210/681, 688; 525/61, 525/62; 528/482

[56] References Cited

U.S. PATENT DOCUMENTS

| | | | |
|---|---|---|---|
| 2,642,419 | 6/1953 | Waugh et al. | 260/91.3 |
| 2,940,948 | 6/1960 | Halbig et al. | 260/29.6 |
| 5,319,070 | 6/1994 | Hayes | 528/482 |

*Primary Examiner*—Ivars Cintins
*Attorney, Agent, or Firm*—Peter A. Fowell

[57] ABSTRACT

Metallic, ash-producing residues which remain in poly(vinyl alcohol) polymer after its preparation from poly(vinyl acetate) are removed by a process which involves contacting a slurry of the poly(vinyl alcohol) polymer, after preparation and before polymer isolation, with ion-exchange resin particles, followed by removal of the ion-exchange resin particles from the poly(vinyl alcohol) polymer particles utilizing size or weight differences between them. The poly(vinyl alcohol) polymer remains in the solid state throughout, avoiding dissolution and the need for re-precipitation.

4 Claims, No Drawings

REMOVAL OF BASE RESIDUES FROM POLY(VINYL ALCOHOL) REACTION- SLURRIES

BACKGROUND OF THE INVENTION

1. Field of the Invention

This invention relates to a process for removing basic, metallic, ash-producing residues remaining in the base-assisted production of poly(vinyl alcohol) polymers from poly(vinyl acetate) polymers. More particularly, it relates to a slurry process which utilizes an ion-exchange resin to separate the basic, metallic ash-producing residues before, rather than after, isolation of the poly(vinyl alcohol) polymer.

2. Description of Related Art

Poly(vinyl alcohol) homopolymer and poly(vinyl alcohol) copolymers, (collectively referred to hereinafter as poly(vinyl alcohol) polymers, or by the abbreviation PVA or PVAs) are produced from the corresponding poly(vinyl acetate) homopolymer and poly(vinyl acetate) copolymers (collectively hereinafter referred to as poly(vinyl acetate) polymers or by the abbreviation PVAC or PVACs) by use of acid or base reactions. The reaction may be, but is not necessarily, catalytic in nature. The process may be catalyzed or otherwise brought about by use of either strong acids or strong bases, and is known as hydrolysis (or saponification) or alcoholysis, depending on the particular reaction. Reactions using base are generally preferred due to greater efficiency and reaction rate. Unfortunately, any unremoved remaining base tends to destabilize the PVA after isolation, during subsequent processing.

Bases are difficult to wash out of the isolated PVA completely, since they tend to be quite strongly absorbed. Base instability may be countered by neutralization of any base remaining before PVA isolation, using weak acids. This produces weakly basic salts such as sodium acetate which are somewhat more amenable to washing out. Such salts themselves, while less destabilizing are, however, still somewhat destabilizing, particularly vis-a-vis recent more demanding uses of PVA. In addition, like other metallic residues, they are ash precursors, in that ash results on subsequent thermal processing of PVA derived products. (Ash, as used here, is the oxide, hydroxide or related complex that results from heating metallic residues).

Metallic ash-producing residues can mount to up to several percent in PVA, if not reduced. In transparent PVA derived products, such as butyrated poly(vinyl alcohol), i.e. poly(vinyl butyral), which is used as a windshield interlayer, ash produces haze at levels above about 0.2 weight percent, and even below this level, can affect weatherability. There is therefore a strong incentive to reduce metallic, ash-producing residues to very low levels.

Remaining metallic residues, when they have been neutralized to form salts, may be removed or reduced by extensive washing of the PVA with water or other solvents, as taught in U.S. Pat. No. 2,642,419. However low salt levels are only achieved by the use of large amounts of solvent, which is inefficient.

Ion-exchange resins (IERs) are known in the removal of metal residues from PVA, as disclosed in U.S. Pat. No. 2,940,948. However, their use required use of an aqueous solution of the PVA. Although this allows ready removal of the IER particles by simple filtration, solid PVA, when required, has to be subsequently isolated by various means. This may involve complex or difficult processes such as re-precipitation, or evaporation and comminution of resulting PVA sheet to particles if PVA is required in particulate form.

The above processes of metal residue removal have been applied either to solid PVA particles, i.e. after PVA isolation (usually removing salts, having neutralized the base residues before isolation), or to PVA prepared as, or converted to, an aqueous solution. It would be highly desirable to have a process to remove ash-precursor metal residues before the steps required to isolate solid PVA, i.e. by removing the basic ash-precursor residues immediately after PVA production, even without neutralization, yet also avoiding solutions of PVA.

SUMMARY OF THE INVENTION

The invention is a process for removal of residual metallic, ash-producing residues from PVA, after its production but before isolation, comprising the steps of:

a) forming a slurry-mixture of (i) the reaction-slurry resulting from base-assisted PVA production from PVAC and (ii) a particulate cation-exchanger ion-exchange resin, wherein the average particle size or weight of the ion-exchange resin is substantially different from the average particle size or weight of the PVA;

b) agitating the slurry-mixture for a time sufficient to effect at least 20 percent ion exchange;

c) optionally removing slurry-liquid, and drying the resultant particle mix;

d) removing the cation-exchanger ion-exchange resin by differential-particle separation means;

e) removing the slurry-liquid and drying the resultant PVA particles when step c) is not carried out.

DETAILED DESCRIPTION OF THE INVENTION

The invention involves the use of cation-exchanger IERs to remove residual basic metallic residues remaining in the base-assisted production of PVA. The method involves preparing the PVA as a slurry of PVA particles in the reaction medium, and adding the IER directly to this reaction-slurry without first isolating the PVA. The reaction-slurry consists of PVA particles, the liquid medium used together with any liquid reaction product such as methyl acetate, (the total liquid being referred to as the slurry-liquid), and any basic metallic residues, which can include salts derived from the base and excess base remaining. These residues may be completely or partially in solution in the slurry-liquid. The slurry-liquid acts as a medium for the exchange. A substantial portion of the total PVA produced in the reaction is recovered, free of IER, by using differential-particle separation techniques to separate PVA and IER particles. The separation of particles may be accomplished before or after removal of the slurry-liquid. Preferably, the slurry-liquid is first removed, and the particle mix dried before particle separation.

Poly(vinyl alcohol) polymers, or PVAs, comprise a large family of poly(vinyl alcohol) hompolymers and copolymers. These polymers are prepared by the partial or essentially complete hydrolysis or alcoholysis of the corresponding poly(vinyl acetate) homopolymer or copolymer, or PVACs. Conversion of anywhere from about 50 to 99 percent of the acetate groups to hydroxyl groups may produce products referred to as poly(vinyl alcohol) polymer. Generally however, 80 percent and above, and usually above 90 percent are converted. When the PVAC is only partially converted to the corresponding PVA the PVA is in effect a poly(vinyl alcohol/vinyl acetate) copolymer (actually a terpolymer if a comonomer was present in the parent PVAC).

Many comonomers are used in PVAs. The amount of comonomer can be up to about 20 weight percent. Above this, many of the characteristic features of PVA begin to diminish. Comonomers which can be used include acrylic, methacrylic, maleic, fumaric and crotonic acids and their metal salts, and alkyl esters. Polyethylene glycol and polypropylene glycol esters with the above acids are also possible. Vinyl chloride and tetrafluoroethylene can also be comonomers. Preferred comonomers include the lower alkyl acrylates and methacrylates. The process of the present invention is applicable to, but not limited to, all of the above copolymers.

The PVA production method to which this invention is applicable is the base-assisted production from a solution of PVAC which results in a slurry of solid, particulate PVA. In producing PVA from PVAC, typically, PVAC dissolved in the reaction medium, is reacted in the presence of base to produce PVA. The PVA, which is largely insoluble in the reaction medium separates out, resulting in a slurry or gelatinous mass (gel). The form of the PVA produced depends on the particular conditions of the process. If the PVAC concentration is kept low at all times, e.g., by adding a PVAC solution slowly to a stirred solution of catalyst, the PVA may come out of solution as distict particles, as a slurry. A commercial process of this sort is known as the Bristol process. Another process adds the catalyst to all of the PVAC at one time, leaving the mixture undisturbed. This typically produces a gel. One such process uses a belt-line, the PVA being produced as a gel-like sheet, which is then typically ground up, the solvent removed, and the product dried. Other factors which can affect the form of the PVA produced are the temperature, and the reaction medium, for instance the mount of water present. The process of this invention is applicable only when the PVA is in the form of a particulate slurry, not when it is produced as a gel.

There may be two distinct reactions involved in base-assisted PVA production from PVAC. One is essentially catalyic, using a metal alkoxide, usually sodium methoxide, or a metal hydroxide such as sodium hydroxide in a solvent for the PVAC, with little or no water present. Relatively small mounts of the base are required, being a catalytic reaction. The PVAC solvent is also a reactant. If methanol is the solvent used, the reaction is essentially the reaction of methanol and the PVAC to produce PVA and methyl acetate. The reaction is thus strictly an alcoholyis, and specifically a methanolysis reaction. The PVA is quite insoluble in the methanol, and it precipitates out. The other reaction which may be involved is non-catalytic. If water is present, hydroylsis can take place, producing PVA and sodium acetate and consuming the base, whether it be an alkoxide or hydroxide. In methanol, the reaction is largely catalytic. With a water/methanol mix, particularly if methanol is in excess, the reaction can be made to be significantly catalytic, despite the presence of some water. In reality, all reactions may be a hybrid of the catalytic and non-catalytic reactions to a greater or lesser extent. Highly catalytic reactions are preferable with regard to base removal, since smaller amounts of base are required, and hence smaller mounts of basic residues remain. For strictly catalytic reaction, totally anhydrous conditions are required, and this is difficult to achieve.

As noted, the present invention is applicable only when the PVA is present in the form of a particulate slurry. A gelatinous mass is not readily convertible into a suitable slurry, though under some circumstances it may be possible. While PVA produced as a gel is amenable to base removal by IERs, as taught in the prior art, the method is quite different. Thus in U.S. Pat. No. 2,940,948, the gelled PVA had first to be dissolved in water before IER treatment. While such a method allows ready removal of the IER by simply filtering it off, solid PVA still has to be isolated from the solution—a not always simple process. By contrast, when the PVA is in the form of a slurry, solid PVA is already present. Direct IER treatment followed by the use of particle-separation techniques avoids the extra steps of dissolution and re-isolation of solid PVA.

The ash-producing metallic residue, in the case of purely catalytic methanolysis reactions using sodium methoxide or hydroxide in methanol, is essentially the sodium methoxide or hydroxide itself. Methoxides may remain dissolved in the methanol, while hydroxides will be less soluble. When the reaction is not completely catalytic, the metallic residue will include some sodium acetate. The process of the present invention is particularly applicable to removal of strongly basic metal alkoxide s and hydroxide residues, thus avoiding the need for a neutralizing step to produce a salt. If salt is present however, the IER is still capable of removing it, since cation exchange is equally possible.

The final metallic residue content can be reduced to very low levels by use of the present invention; for instance, to below 10% of that which would remain without metallic residue removal (i.e. 90% reduction). The process is also applicable when only moderate reduction of potential metallic residue, say only 20% reduction, is required.

At least some solubility of the metallic residues in the slurry-liquid is required for their removal from the reaction-slurry by ion exchange. The slurry-liquid may be further adjusted to have more optimum solubility characteristics for the ion-exchange process, i.e., lowest PVA solubility and highest metallic residue solubility.

There are two quite distinct requirements for the IER. One is purely physical; the average size or weight of the IER particles relative to those of the PVA. The other is chemical or physical-chemical and relates to how rapidly ion-exchange can take place.

In the exchange, metal cations from the metal residues become preferentially associated with the strong acid anions which form part of the IER. Efficiency, in terms of rate and equilibrium exchange achievable, will depend on the acidity of the anion in the IER, and the ease of penetration of the slurry-liquid containing dissolved base, into the IER. When sodium hydroxide is the base used, and sodium hydroxide remains (in addition to some sodium acetate), treatment with the IER may be considered a neutralization of the IER with sodium hydroxide. Neutralization in this case, however, is in effect still an ion-exchange. In this disclosure, the term ion-exchange is used whether IER interaction is with metal alkoxide, hydroxide or salt. The term salt is reserved for acid salts such as sodium acetate, even though by some definitions metal alkoxides are salts.

Chemically, the IERs used in the process of this invention are acid containing cation-exchanger type resins. Many cation-exchanger IERs are known in the art. They are typically polystyrene or polyacrylic resins containing an acid functionality, incorporated either by post reaction or by copolymerization, and crosslinked, typically with a polyvinyl monomer such as divinyl benzene or a dimethacrylate. They may also be crosslinked cellulosic resins containing an acid functionality. The acid anions are typically carboxylic, sulfonic or phosphoric. Many such resins are available commercially.

The rate of ion exchange will depend on the particular acid anion, its amount, and on physical factors such as porosity, and solvent permeability or absorbability of the IER. It is not essential to have a detailed knowledge of the relation between these various factors. Suitable resins may readily be selected by a minimum amount of testing. The resins employed in the testing described below were quite adequate. No attempt was made to further optimize choice of the IER with regard to its physical or chemical characteristics.

The slurry-liquid of the reaction-slurry which is to be treated with the IER must have, or be modified to have, certain characteristics. As noted above, ideally it should be a non-solvent for the PVA and a solvent or partial-solvent for the metallic residues to be removed, at the slurry temperature used. Preferably however, it must not have dissolved more than 10 weight percent of the PVA, and more preferably even less. In a batch process, if any of the PVA dissolves in the slurry-liquid there will be a PVA yield loss, unless expensive re-precipitation is used to recover the dissolved PVA. In a continuous process however, the PVA-saturated slurry-liquid could be recycled, essentially eliminating such loss. Solubility of the metallic residue in the slurry-liquid is preferably as high as possible, concomitant with low PVA solubility in the liquid. High solubility of the metallic residue is desirable because the ion-exchange process may proceed faster when more of the metallic residue is in solution. However, it has been found that quite low solubilities can provide the necessary conduit for the process to work. For instance with less soluble salts, as low as 5 weight percent dissolved in the slurry-liquid is adequate, since more residue can dissolve as metal cations are removed by the IER.

PVAs will have varying solubility in any particular liquid depending on the degree of conversion of the PVAC, whether a copolymer or not, and what particular comonomer. More crystalline, fully-hydrolyzed homopolymer PVA tends to dissolve more slowly, and to a lesser extent than 'homopolymer' PVA which has been hydrolysed to a lesser extent (which is, in reality, a poly(vinyl alcohol/vinyl acetate) copolymer). In water, for instance, fully-hydrolysed homopolymer PVA is difficult to dissolve under 50 deg. C. While comonomers reduce crystallinity, less polar comonomers will also reduce overall polarity of the polymer as comonomer level increases, so that the polarity of the particular slurry-liquid will also be important.

The slurry-liquid may by modified to improve these solubility/insolubility characteristics with a large variety of liquids such as aliphatic esters, alcohols, ketones and water. It is within the skill of the artisan to judge which are suitable or optimum slurry-liquids for a given PVA type. Process variables are relatively simple, and trial and error will readily determine which are better liquids. Preferred slurry-liquids are methanol, ethanol, acetone, methyl acetate, or mixtures of these, or mixtures of these with some water. Mixtures of methanol with up to 20 weight percent water, for instance, has been found suitable particularly when some sodium acetate is present. However, no systematic optimization has been carried out. Modification of the slurry-liquid composition however is not essential. In the examples given in this disclosure, where the PVA was produced using sodium methoxide catalysis in methanol, the slurry-liquid was not modified before addition of the IER, methanol, together with methyl acetate formed, being adequate as the slurry-liquid.

A range of solid PVA/slurry-liquid ratios is possible in the process of the invention. From about 0.05/1 to 0.95/1 ratio is possible, but 0.2/1 to 0.8/1 is preferred, and 0.3/1 to 0.6/1 is most preferred. The less liquid, the more efficient the process from a handling and solids drying point of view.

The amount of IER employed will of course depend on the amount of basic metallic residue desired to be removed. Generally but not necessarily, excess IER, based on the number of moles of acid equivalent available in the IER relative to the number of moles of base equivalent in the metallic residue should be employed. Depending on the amount of residue present, the amount of removal required, the IER used, and what are judged to be acceptable times for the residue removal process, the IER may amount to anywhere from as low as 3 weight percent of the weight of solid PVA present in the slurry to as much as 50 weight percent of the weight of solid PVA present.

Exchange is conveniently achieved by agitating the slurry/IER mix for a period of from between about 5 minutes to two hours, at temperatures ranging from room temperature to about 50 deg. C. Typically, in small scale experiments, a half-hour agitation by stirring at about 24 deg. C. was found satisfactory. Preferably, agitation times are as short as possible concomitant with the degree of residue removal desired. Preferably, times less than half an hour, at ambient temperatures (20–30 deg. C.) are desirable.

Once exchange has taken place, the particulate metal ion-containing IER is separated from the particulate PVA. This is achieved using well-known differential particle separation techniques. Separation may be based on either particle size or particle weight.

For separation based on size to be achieved, the PVA particles must have a substantially different average size from those of the IER (or more precisely, the IER after it has undergone the necessary exchange, and with regard to the amount of liquid that remains absorbed by it). The PVA slurry/IER mix itself may be separated into parts (i.e., without slurry-liquid removal); one containing PVA particles free of IER together with some slurry-liquid, and the other the IER particles with some slurry-liquid, possibly also containing a small amount of PVA, using selective filtration of particles, by employing filters with selected pore size. The liquid is then removed from the PVA particles and the PVA dried. Alternatively, and far preferably, the slurry-liquid is first removed from the PVA/IER particle mix, the mixed particles dried, and the dried mixed particles separated to provide an IER-free PVA portion, by sieving, using selected sieve screen sizes. Selection of sieve screen size for dry-particle separation is analogous to selecting filter pore size in the case of wet-particle separation in the slurry. Dry-particle separation using sieves was tested extensively.

The efficiency of such separation will depend on a large number of factors. Most important will be the size differential between, o and size distribution of, the PVA particles and the IER particles. The narrower the size distributions, in general, the less size differential will be necessary for efficient separation. It is not critical whether the PVA or the IER has the larger particle size. Of course, for a given PVA product and process, the size and size distribution may be essentially fixed, and the choice of suitable particle size IER will become the key factor. The efficiency of the separation process for a particular PVA may be improved over that achievable by commercially available IERs by tailoring production of specially suitable particle size/distribution IERs. There is however, a considerable range of IERs available.

Alternatively, it may be possible to change process parameters in the production of the PVA to change particle size and distribution. In the examples included in this application, efficiency was limited to that possible with the PVA prepared as described, and the IERs chosen. No attempt was made to optimize PVA particle size distribution in the PVA production process, or have IERs specifically designed.

Separation must obviously be such that the PVA recovered is 'uncontaminated' with any IER. It is not essential that the separated IER be completely free of PVA however. Nevertheless, any PVA remaining with the IER represents a PVA yield loss. The IER should therefore be removed from a substantial portion of the PVA. By substantial portion it is meant that at least 50 percent of the PVA can be recovered free of IER. This however is least desirable, and it is highly desirable that more than 95 percent of the P VA is recovered free of IER, and full recovery is the ideal.

For the PVA to remain uncontaminated, it is clear that, while there can be particle size overlap, if the IER has the smaller particle size and is to be allowed to pass through a sieve to separate, then its largest particles must be smaller than the sieve holes. Conversely, if the IER has the larger size particles, its smallest particles must be retained by the screen.

The phrase 'substantially different' referring to particle size is not readily numerically definable, since size distribution functions would be involved. As used in this disclosure, it means that the size and distribution of the PVA and IER is sufficiently different that sieving is capable of producing an IER-free PVA fraction, and that a substantial portion as defined above (at least 50 weight percent of the original PVA) is recovered in that fraction.

Separation may also be achieved utilizing difference in weight of the PVA and IER particles, using fluidized-bed techniques. Difference in weight of the two types of particles may result from either difference in density of similar sized PVA and IER particles or difference in size of similar density PVA and IER particles (or some combination of the two). Of course, when difference in size is used to achieve difference in weight, it is the difference in weight and not size difference which is utilized for separation. Optimization of this technique is possible, by using different IERs or by controlling the nature of the PVA.

Variation in density of different PVAs may result from crystallinity differences between a homopolymer and a copolymer. Some PVAs may also be quite porous. Varying porosity may be used to provide some control on the weight of PVA particles.

The phrase 'substantially different' in reference to particle weight is defined in an analogous way to the functional definition used in relation to separation based on size, noted above.

EXAMPLES

Grades of IER used.

The IERs used varied in composition. All had a large average particle size, (large enought to be retained by a 50 mesh screen). IERs can absorb a considerable amount of water, and it is important when describing particle size and ion exchange capacity to specify the basis, dry or wet. The IERs used are shown in Table 1.

TABLE 1

IERS USED

| Code | Composition | IEC (meq/g) | IEC (meq/ml) | Wet Density (g/ml) | Wet Mesh | Sieve to (1) |
|------|-------------|-------------|--------------|--------------------|----------|---------------|
| A | MAA/DVB | 10 | 3.5 | .69 | 16–50 | <40 |
| B | S/DVB-sulf. | 3.3 | 1.0 | — | — | <40 |
| C | S/DVB-sulf. | 4.6 | 1.8 | .80 | 16–50 | <40 |
| D | AA/DVB | 10.5 | 3.5 | .75 | 16–50 | <40 |
| E | S/8%DVB-sulf. | 5 | 1.9 | .85 | 16–50 | <40 |
| F | S/20%DVB-sulf. | — | 1.7 | .80 | 16–40 | <40 |

S = styrene; AA = acrylic acid; DVB = divinyl benzene;
sulf. = sulfonated;
IEC is Ion-exchange capacity based on dry weight (milli-equivalents/gram), and wet volume (milli-equivalents/milliliter.)
(1) Sieved to <40 means material retained on 40 mesh screen.
Wet density and Wet Mesh refer to the IER when it has absorbed equilibrium amount of water.
Mesh size refers to U.S. Standard sizes.
A. AMBERLITE IRC-50(H), Rohm and Haas.
B. AMBERLYST XN-1010, Rohm and Haas.
C. AMBERLYST 15(H), Rohm and Haas.
D. AMBERLITE IRC-76(H), Rohm and Haas.
E. AMBERLITE IR-120Plus(H) Rohm and Haas.
F. AMBERLITE 200C(H)(16/40) Rohm and Haas.

EXAMPLES C1 TO C4 AND 1 TO 15

Two series of tests were carried out. The first series, which include Examples 1 to 6 and Comparative Examples C1 and C2, used a relatively high level of sodium methoxide base catalyst in an alcoholyis reaction. The second series, Examples 7 to 15, and Comparative Examples C4 and C5 used half the level of the first series, also using sodium methoxide in methanol. The preparation of the reaction-slurry from base catalysis of PVAC with sodium methoxide in methanol is described, followed by a description of the addition of IER resin directly to the resulting reaction-slurry, the step of ion-exchange, IER resin particle separation and PVA product isolation.

For the first series 80.4 grams of a 25 weight percent solution of sodium methoxide in methanol was mixed with a further 1600 grams of methanol. The mixture was stirred, keeping the temperature at 56.3±1 deg. C. under a nitrogen atmosphere. Over a period of 1.8 hours, 1600 grams of a 40 weight percent solution of a medium molecular weight grade of poly(vinyl acetate) hompolymer in methanol was added. The temperature rose slightly as the PVA precipitated out, forming a slurry with the methanol. The slurry was stirred for an additional hour at about 58.4 deg. C., then allowed to cool to room temperature. This resulting reaction-slurry was then divided into portions, and each portion subjected to IER treatment, or used as a control, as described below.

In the second series, the steps were the same, except for minor differences in temperature and times involved, and for the amount of catalyst used. In this series only 40.24 grams of the 25 weight percent sodium methoxide in methanol was used. All other amounts were the same. The PVAC solution was added to the stirred sodium methoxide solution at 58.5±1.5 deg. C. over a 2.3 hour period, and further stirred at 57 deg. C. for half an hour, and allowed to cool. Based on the amount of PVAC to start, assuming near complete methanolysis, the resulting slurry in all examples contained about 10% solid PVA in the slurry-liquid, which is the methanol together with the reaction product, methyl acetate. The resulting reaction-slurry was divided and used in the same way, as described below.

A weighed mount of IER resin was added to weighed portions of the reaction-slurry. The resulting slurry-mix was stirred at room temperature (~24 deg. C.) for half an hour, followed by vacuum filtration on a fritted-glass filter for about one minute at about 25 inches of mercury pressure. The wet solid was dried in a vacuum oven with nitrogen purge overnight at room temperature, then for 4 hours at 80 deg. C., and the dry weight measured. The solid was then sieved using a 140 mesh (0.0041 inches) screen. The IER was completely retained, together with a small amount of PVA. The bulk of the PVA passed through the screen, and was uncontaminated with IER. It was weighed, and an ash analysis carried out. Details are shown in Table 2.

The weight of IER shown is the weight of IER with whatever water it has absorbed, and thus may be considerably higher than the weight of IER on a dry basis. In Examples 5 and 6, the amount of IER removed by sieving (difference between Dry solid wt. and Product wt.) appears to be less than the amount added (10 grams in these examples). This is because of the considerable amount of water in the IER weight, the water having been driven off before the PVA/IER mix Dry solid weight was determined. Also note that the Product weight of the PVA after sieving may include weight due to a small amount of absorbed water during sieving. This explains why, in the comparative examples C1 and C2, the Product weight is slightly higher than the Dry solid weight. Since no IER was used in these comparative examples, the weights should be the same. Even though no IER was used, the product was put through a sieve, during which time it was possible for a small amount of water to be absorbed.

In these tests, the PVA/IER ratio was about 10/1 to 2/1, and the total solid (PVA plus IER) to slurry-liquid ratio was about 0.2/1 to 0.15/1.

The weight percent ash is determined by preparing a 4 to 8 weight percent water slurry of the product PVA, stirring for about 5 minutes, and titrating with 0.2 to 0.02N hydrochloric acid solution. Percent ash is calculated as the weight of Na2O which is equivalent to the base equivalent found. In the comparative Examples C2 and C4, the reaction slurry was neutralized with acetic acid before filtering off the PVA particles. No IER was used. In comparative Examples C1 the slurry was filtered while in comparative Example C3 the slurry was not filtered, but merely dried.

Examination of the data indicates that some IERs are more effective than others, and that increasing the amount of IER in the slurry reduces residual ash content. In some examples the IER designated C was particularly effective, reducing ash to levels as low as 0.09 weight percent for the high reaction catalyst level, and 0.04 weight percent for the lower reaction catalyst level.

In general, while complete removal of the IER from the PVA product was always achieved, a small amount of PVA was always retained on the sieve with the IER. This represents a small PVA yield loss. Other than this loss, most of the PVA in the slurry was recovered. The solid PVA, as noted above, amounts to about 10 weight percent of the reaction-slurry. Since the product weight can be seen to be in the region of 10 weight percent of the slurry weight, the percent PVA recovered was clearly very high, generally above 90% and usually higher still.

TABLE 2

ASH REDUCTION USING IER SLURRY TECHNIQUE:

| Example # | Reaction-slurry wt. (grams) | IER Code/wt. (grams) | Dry solid wt. (PVA/IER) (grams) | Product wt. (PVA) (grams) | Ash Content (wt. %) |
|---|---|---|---|---|---|
| C1 | 237.2 | None | 23.2 | 24.0 | 0.91 |
| C2 | 342.7 | None | 33.8 | 34.1 | 0.63 |
| 1 | 290.8 | A/9.0 | 34.4 | 26.4 | 0.43 |
| 2 | 286.8 | B/7.5 | 35.8 | 27.4 | 0.30 |
| 3 | 290.8 | B/10.0 | 37.7 | 26.0 | 0.18 |
| 4 | 302.5 | C/10.0 | 41.2 | 29.0 | 0.09 |
| 5 | 303.0 | D/10.0 | 36.3 | 30.1 | 0.32 |
| 6 | 304.5 | D/10.0 | 35.5 | 31.0 | 0.32 |
| C3 | 72.6 | None | 9.4 | 7.8 | 1.65 |
| C4 | 253.7 | None | 27.2 | 24.6 | 0.42 |
| 7 | 260.5 | B/2.5 | 30.1 | 24.2 | 0.27 |
| 8 | 282.0 | B/5.0 | 34.4 | 23.8 | 0.19 |
| 9 | 273.4 | B/7.5 | 35.7 | 27.7 | 0.02 |
| 10 | 253.5 | C/5.0 | 31.7 | 24.5 | 0.12 |
| 11 | 254.5 | C/7.5 | 34.0 | 25.5 | 0.05 |
| 12 | 270.0 | C/7.5 | 35.4 | 26.3 | 0.04 |
| 13 | 254.8 | D/7.5 | 31.1 | 23.8 | 0.19 |
| 14 | 274.0 | E/7.5 | 34.3 | 24.6 | 0.10 |
| 15 | 235.3 | F/7.5 | 30.3 | 22.5 | 0.09 |

IER code letters refer to codes in Table 1.

I claim:
1. A process for removal of residual metallic, ash-producing residues from poly(vinyl alcohol) polymer, after its production as a particulate slurry but before its isolation, comprising the steps of:
  a) forming a slurry-mixture from (i) the reaction slurry resulting from base-assisted poly(vinyl alcohol) polymer production from poly(vinyl acetate) polymer and (ii) a particulate, cation-exchange, ion-exchange resin, wherein the average particle size or weight of the ion-exchange resin is substantially different from the average particle size or weight of poly(vinyl alcohol) polymer particles;
  b) agitating the slurry-mixture for a time sufficient to effect at least 20 percent ion exchange of cations in the ion-exchange resin with metal ions;
  c) optionally removing the slurry-liquid of the slurry-mixture, and drying the resultant particle mix;
  d) removing the ion-exchange resin by differential-particle separation means selected from the group consisting of selective filtration of the resultant wet-particle mix when optional drying step c) is not carried out, selective sieving of the resultant dried-particle mix when optional drying step c) is carried out, and fluidized-bed classification of the resultant dried-particle mix when optional drying step c) is carried out; and e) removing the slurry-liquid and drying the resultant poly(vinyl alcohol) polymer, when step c) is not carried out.

2. The process of claim 1, where step c) is carried out, and step d) is achieved by selective sieving of the resultant dried-particle mix.

3. The process of claim 1, where step c) is carried out, and step d) is achieved by fluidized-bed classification of the resultant dried-particle mix.

4. The process of claim 1, wherein the slurry-mixture of the reaction-slurry and the ion-exchange resin is modified by addition of more liquid before ion-exchange is effected, in order to increase the solubility of the basic metallic residues and decrease the solubility of the poly(vinyl alcohol) polymer, the additional liquid being selected from the group consisting of water, aliphatic alcohols, aliphatic ketones and aliphatic esters, and mixtures thereof.

* * * * *